United States Patent

Schwarz, Jr.

[11] Patent Number: 5,882,389
[45] Date of Patent: Mar. 16, 1999

[54] INK JET INKS CONTAINING OXAZOLIDINONES

[75] Inventor: William M. Schwarz, Jr., Webster, N.Y.

[73] Assignee: Xerox Corporation, Stamford, Conn.

[21] Appl. No.: 878,513

[22] Filed: Jun. 19, 1997

[51] Int. Cl.$^6$ ................................................. C09D 11/02
[52] U.S. Cl. ..................................... 106/31.49; 106/31.78
[58] Field of Search ............................... 106/31.49, 31.78

[56] References Cited

U.S. PATENT DOCUMENTS

| | | | |
|---|---|---|---|
| 4,365,998 | 12/1982 | Sugiyama et al. | 106/31.49 |
| 5,173,112 | 12/1992 | Matrick et al. | 106/31.43 |
| 5,205,861 | 4/1993 | Matrick | 106/31.49 |
| 5,223,026 | 6/1993 | Schwartz, Jr. | 106/31.43 |
| 5,300,143 | 4/1994 | Schwartz, Jr. | 106/31.43 |
| 5,580,373 | 12/1996 | Lane et al. | 106/31.49 |
| 5,698,017 | 12/1997 | Sacripante et al. | 106/31.49 |
| 5,753,017 | 5/1998 | Onodera et al. | 106/31.49 |

FOREIGN PATENT DOCUMENTS 228476  8/1994  Japan .

*Primary Examiner*—Helene Klemanski
*Attorney, Agent, or Firm*—Judith L. Byorick

[57] ABSTRACT

Disclosed is an ink composition which comprises water, a colorant, and a monomeric oxazolidinone compound. In one embodiment, the oxazolidinone compound is of the formula

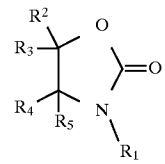

wherein $R_1$ is a hydrogen atom, an alkyl group, or a substituted alkyl group, and $R_2$, $R_3$, $R_4$, and $R_5$ each, independently of the others, are hydrogen atoms, alkyl groups, substituted alkyl groups, or alkoxy groups. Also disclosed are ink jet printing processes using the aforementioned ink.

21 Claims, No Drawings

INK JET INKS CONTAINING OXAZOLIDINONES

BACKGROUND OF THE INVENTION

The present invention is directed to aqueous ink compositions. More specifically, the present invention is directed to ink compositions suitable for use in ink jet printing processes. One embodiment of the present invention is directed to an ink composition which comprises water, a colorant, and a monomeric oxazolidinone compound.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

U.S. Pat. No. 5,300,143 (Schwarz), the disclosure of which is totally incorporated herein by reference, discloses an ink composition which comprises water, a water soluble dye, a first component selected from the group consisting of sulfones and mixtures thereof, and a second component selected from the group consisting of cyclic amines having at least one hydrogen atom bonded to a nitrogen atom, cyclic amides having at least one hydrogen atom bonded to a nitrogen atom, diamides having at least one hydrogen atom bonded to a nitrogen atom, polyalkoxy-substituted amides having at least one hydrogen atom bonded to a nitrogen atom, polyimine-substituted amides having at least one hydrogen atom bonded to a nitrogen atom, and mixtures thereof. Also disclosed is an ink jet printing process employing these inks.

U.S. Pat. No. 5,223,026 (Schwarz), the disclosure of which is totally incorporated herein by reference, discloses a thermal ink jet printing process which comprises incorporating into a thermal ink jet printing apparatus an ink composition comprising a colorant and a liquid vehicle which comprises a mixture of water and an organic component selected from the group consisting of cyclic amides, cyclic esters, polyethoxy-substituted or polyimine-substituted amides, and mixtures thereof, and heating selected nozzles in the printing apparatus containing the ink, thereby causing droplets of the ink to be ejected in an imagewise pattern onto a substrate.

Organic solvents and humectants included in ink jet ink compositions have a number of requirements, including water miscibility, thermal stability, hydrolytic stability, low volatility, high boiling point, high surface tension, low viscosity, compatibility with colorants, and the like. Glycols and glycol derivatives are the most widely used solvents and humectants; these materials, however, tend to result in formation of ink compositions with undesirably high viscosities, resulting in less than optimum frequency response and latency when the inks are used in ink jet printing processes. Latency in particular becomes a more critical issue with the introduction of printheads having small channels and relatively high values of dots per inch.

Accordingly, while known compositions and processes are suitable for their intended purposes, a need remains for improved ink compositions suitable for use in ink jet printing processes. In addition, a need remains for ink compositions suitable for ink jet printing containing solvents or humectants with high water miscibilities. Further, a need remains for ink compositions suitable for ink jet printing containing solvents or humectants with high thermal stabilities. Additionally, a need remains for ink compositions suitable for ink jet printing containing solvents or humectants with high hydrolytic stabilities. There is also a need for ink compositions suitable for ink jet printing containing solvents or humectants with low volatilities. In addition, there is a need for ink compositions suitable for ink jet printing containing solvents or humectants with high boiling points. Further, there is a need for ink compositions suitable for ink jet printing containing solvents or humectants that are highly compatible with a large number of colorants, cosolvents, and ink additives. Additionally, there is a need for ink compositions suitable for ink jet printing containing solvents or humectants with low viscosities. A need also remains for ink compositions suitable for ink jet printing containing solvents or humectants with high surface tensions. There is also a need for ink compositions suitable for ink jet printing which have low viscosities. In addition, there is a need for ink compositions suitable for ink jet printing which exhibit improved latency characteristics. Further, a need remains for ink compositions suitable for ink jet printing which exhibit improved frequency response characteristics. Additionally, a need remains for ink compositions suitable for ink jet printing processes employing printheads with small channels and capable of printing 600 or more dots per inch. There is also a need for ink compositions suitable for ink jet printing processes which are toxicologically and environmentally safe. Further, there is a need for ink compositions suitable for ink jet printing which generate high quality images on paper. Additionally, there is a need for ink compositions suitable for ink jet printing which generate high quality images on transparencies.

SUMMARY OF THE INVENTION

It is an object of the present invention to provide ink compositions and printing processes with the above noted advantages.

It is another object of the present invention to provide improved ink compositions suitable for use in ink jet printing processes.

It is yet another object of the present invention to provide ink compositions suitable for ink jet printing containing solvents or humectants with high water miscibilities.

It is still another object of the present invention to provide ink compositions suitable for ink jet printing containing solvents or humectants with high thermal stabilities.

Another object of the present invention is to provide for ink compositions suitable for ink jet printing containing solvents or humectants with high hydrolytic stabilities.

Yet another object of the present invention is to provide ink compositions suitable for ink jet printing containing solvents or humectants with low volatilities.

Still another object of the present invention is to provide ink compositions suitable for ink jet printing containing solvents or humectants with high boiling points.

It is another object of the present invention to provide ink compositions suitable for ink jet printing containing solvents or humectants that are highly compatible with a large number of colorants, cosolvents, and ink additives.

It is yet another object of the present invention to provide ink compositions suitable for ink jet printing containing solvents or humectants with low viscosities.

It is still another object of the present invention to provide ink compositions suitable for ink jet printing containing solvents or humectants with high surface tensions.

Another object of the present invention is to provide ink compositions suitable for ink jet printing which have low viscosities.

Yet another object of the present invention is to provide ink compositions suitable for ink jet printing which exhibit improved latency characteristics.

Still another object of the present invention is to provide ink compositions suitable for ink jet printing which exhibit improved frequency response characteristics.

It is another object of the present invention to provide ink compositions suitable for ink jet printing processes employing printheads with small channels and capable of printing 600 or more dots per inch.

It is yet another object of the present invention to provide ink compositions suitable for ink jet printing processes which are toxicologically and environmentally safe.

It is still another object of the present invention to provide ink compositions suitable for ink jet printing which generate high quality images on paper.

Another object of the present invention is to provide ink compositions suitable for ink jet printing which generate high quality images on transparencies.

These and other objects of the present invention (or specific embodiments thereof) can be achieved by providing an ink composition which comprises water, a colorant, and a monomeric oxazolidinone compound.

DETAILED DESCRIPTION OF THE INVENTION

The oxazolidinone compounds suitable for the inks of the present invention are monomeric. Typical oxazolidinone compounds include those of the general formula

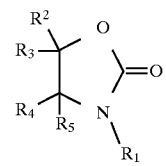

wherein $R_1$ is a hydrogen atom, an alkyl group (including cyclic alkyl groups), preferably with from 1 to about 12 carbon atoms and more preferably with from 1 to about 3 carbon atoms, such as methyl, ethyl, propyl, butyl, cyclohexyl, and the like, a substituted alkyl group, preferably with from 1 to about 12 carbon atoms and more preferably with from 1 to about 3 carbon atoms, wherein the substituent or substituents on the alkyl group can be (but are not limited to) hydroxy groups, alkoxy groups, including those of the general formula —$(O(CH_2)_y)_zOH$, wherein y is an integer of from 1 to about 4 and z is an integer of from 1 to about 50, preferably from 1 to about 20, more preferably from 1 to about 3, and the like, and $R_2, R_3, R_4,$ and $R_5$ each, independently of the others, are hydrogen atoms, alkyl groups (including cyclic alkyl groups), preferably with from 1 to about 12 carbon atoms and more preferably with from 1 to about 3 carbon atoms, such as methyl, ethyl, propyl, butyl, cyclohexyl, and the like, substituted alkyl groups, preferably with from 1 to about 12 carbon atoms and more preferably with from 1 to about 3 carbon atoms, and alkoxy groups, including those of the general formula —$(O(CH_2)_y)_zOH$, wherein y is an integer of from 1 to about 4 and z is an integer of from 1 to about 50, preferably from 1 to about 20, more preferably from 1 to about 3, wherein the substituent or substituents on the alkyl groups can be (but are not limited to) hydroxy groups, alkoxy groups, including those of the general formula —$(O(CH_2)_y)_zOH$, wherein y is an integer of from 1 to about 4 and z is an integer of from 1 to about 50, preferably from 1 to about 20, more preferably from 1 to about 3, and the like.

Materials suitable for the present invention are either liquids or solids at room temperature (about 25° C.). Several of these materials also exhibit high boiling points of at least 260° C. under ambient pressures, and in many cases have boiling points of over 300° C. at ambient pressures.

Oxazolidinone compounds (also referred to as oxazolidone compounds) can be obtained commercially, from, for example, Aldrich Chemical Co., Milwaukee, Wis. Oxazolidinone compounds are also relatively easy to prepare. For example, β-amino alcohols can be treated with ethylene carbonate followed by distillation of the product to yield the desired oxazolidinone, as follows:

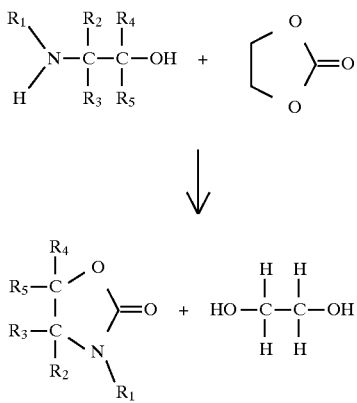

Alternatively, the cyclic ethylene carbonate can be replaced with diethyl ketone and performed with base catalysis. The reactants are present in approximately equimolar amounts and the reaction takes 5 about 12 hours at 45° C. in a solvent such as methanol.

Oxazolidinone compounds can also be prepared by the reaction of a β-amino alcohol and phosgene, as follows:

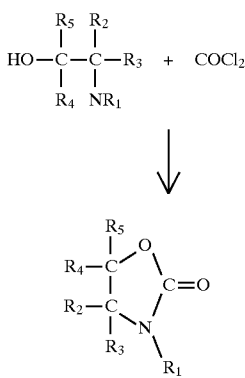

The phosgene can be supplied as a gas, in solution, or as a complex with pyridine.

Oxazolidinone compounds can further be prepared by the reaction of an epoxide and an isocyanate or an isothiocyanate, as follows:

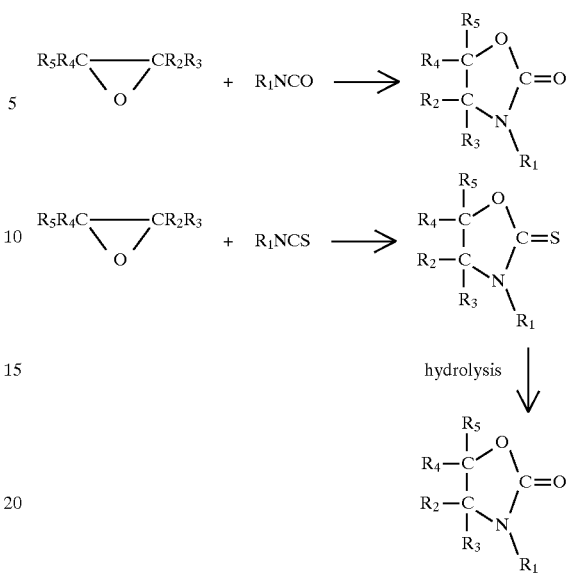

The reaction takes place at elevated temperatures, optionally in the presence of a solvent such as dimethylformamide, acetonitrile, dioxane, benzene, or the like, and is optionally catalyzed by materials such as secondary and tertiary amines, quaternary ammonium halides, carboxylate anions, zinc chloride, iron chloride, lithium chloride, other halide anion sources, or the like.

Further information regarding the synthesis of oxazolidinone or oxazolidone compounds is disclosed in, for example, E. Dyer and H. Scott, "Preparation of Polymeric and Cyclic Urethanes and Urea From Ethylene Carbonate and Amines," *J. Am. Chem. Soc.,* 79, 672 (1957); V. A. Pankratov, Ts. M. Frenkel, and A. M. Fainleib, "2-Oxazolidinones," *Russian Chemical Reviews,* 52(6), 576 (1983) (translated from *Uspekhi Khimii,* 52, 1018 (1983)); M. E. Dyen and D. Swern, "2-Oxazolidones," *Chem. Rev.,* 67, 197 (1967); U.S. Pat. No. 2,975,187; U.S. Pat. No. 3,131,197; U.S. Pat. No. 3,120,510; U.S. Pat. No. 2,399,118; U.S. Pat. No. 2,437,388; U.S. Pat. No. 2,437,389; U.S. Pat. No. 2,437,390; U.S. Pat. No. 2,695,300; U.S. Pat. No. 3,133,932; U.S. Pat. No. 2,973,366; U.S. Pat. No. 2,485,855; U.S. Pat. No. 2,740,792; U.S. Pat. No. 2,843,585; U.S. Pat. No. 2,857,392; U.S. Pat. No. 2,773,067; U.S. Pat. No. 3,062,826; U.S. Pat. No. 2,865,926; U.S. Pat. No. 3,214,435; U.S. Pat. No. 3,231,578; U.S. Pat. No. 2,977,369; U.S. Pat. No. 3,817,938; U.S. Pat. No. 3,687,897; and U.S. Pat. No. 2,868,801, the disclosures of each of which are totally incorporated herein by reference.

Specific examples of suitable oxazolidinones include 2-oxazolidinone, of the formula

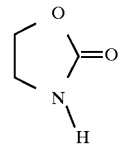

3-methyl-2-oxazolidinone, of the formula

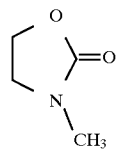

3-ethyl-2-oxazolidinone, of the formula

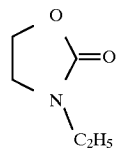

3-butyl-2-oxazolidinone, of the formula

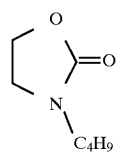

3-cyclohexyl-2-oxazolidinone, of the formula

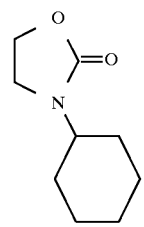

3-(hydroxyethyl)-2-oxazolidinone, of the formula

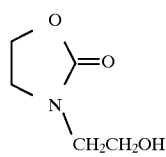

4-methyl-2-oxazolidinone, of the formula

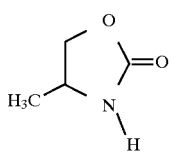

5-methyl-2-oxazolidinone, of the formula

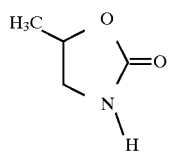

3,5-dimethyl-2-oxazolidinone, of the formula

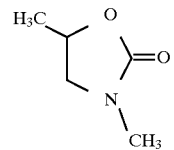

3-ethyl-5-methyl-2-oxazolidinone, of the formula

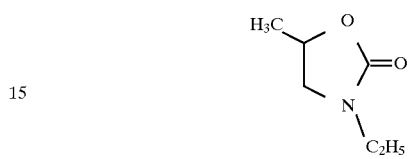

3-butyl-5-methyl-2-oxazolidinone, of the formula

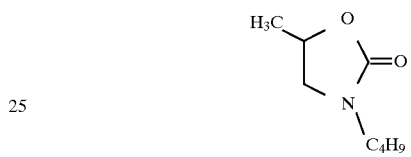

3-(2-hydroxypropyl)-5-methyl-2-oxazolidinone, of the formula

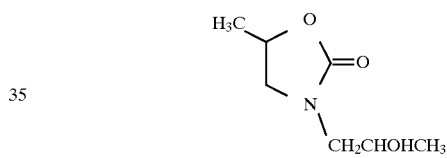

4-ethyl-2-oxazolidinone, of the formula

5-ethyl-2-oxazolidinone, of the formula

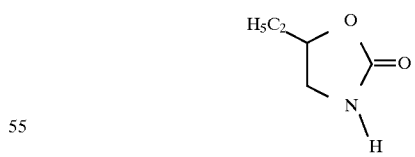

4,4-dimethyl-2-oxazolidinone, of the formula

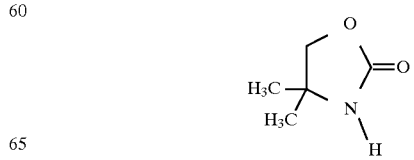

5,5,3-trimethyl-2-oxazolidinone, of the formula

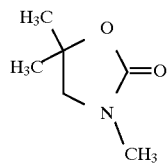

5-methyl-3-ethyl-2-oxazolidinone, of the formula

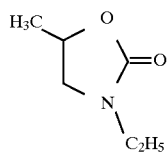

3-(2-hydroxypropyl)-5-methyl-2-oxazolidinone, of the formula

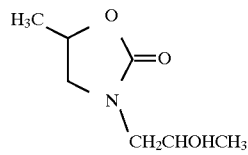

5-isopropyl-3-methyl-2-oxazolidinone, of the formula

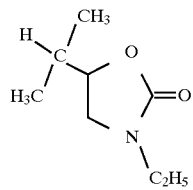

5-ethyl-4-methyl-2-oxazolidinone, of the formula

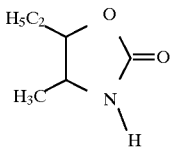

5-methyl-3-(hydroxyethyl)-2-oxazolidinone, of the formula

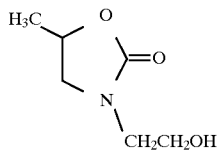

4,5-dimethyl-3-(hydroxyethyl)-2-oxazolidinone, of the formula

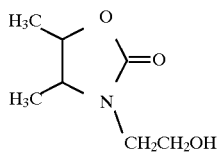

5,5-dimethyl-3-ethyl-2-oxazolidinone, of the formula

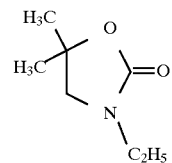

3,5-diethyl-5-methyl-2-oxazolidinone, of the formula

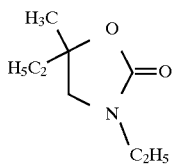

5-methyl-3-cyclohexyl-2-oxazolidinone, of the formula

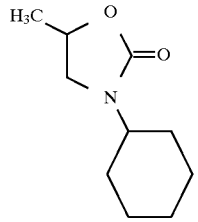

4,5-dimethyl-3-cyclohexyl-2-oxazolidinone, of the formula

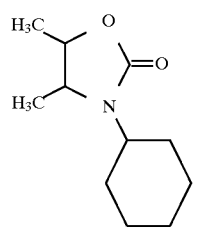

3,4,5-trimethyl-2-oxazolidinone, of the formula

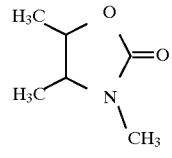

3-butyl-4-ethyl-5-methyl-2-oxazolidinone, of the formula

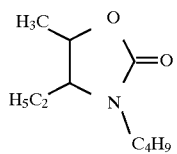

4-ethyl-2-oxazolidinone, of the formula

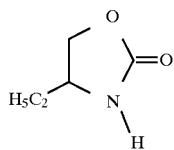

4,4-diethyl-2-oxazolidinone, of the formula

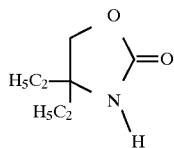

5,5-diethyl-3-methyl-2-oxazolidinone, of the formula

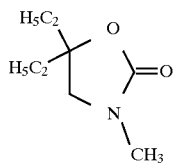

3-(hydroxyethoxyethyl)-2-oxazolidinone, of the formula

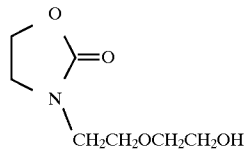

and the like, as well as mixtures thereof.

Specific oxazolidinones, including (but not limited to) 2-oxazolidinone and the butyl oxazolidinones, may be preferred in some instances as superior penetrants. Specific oxazolidinones, including (but not limited to) 4-ethyl-2-oxazolidinone and 5-ethyl-2-oxazolidinone, may also be preferred for inks wherein improved edge sharpness, greater hydrogen bonding, and specific solubility, viscosity, fluidity, and surface tension characteristics are desired. Oxazolidinones wherein the ring nitrogen atom is bonded to a hydrogen atom rather than to an alkyl group may be preferred in some instances for their ability to impart to the ink higher surface tension and greater paper compatibility. Specific oxazolidinones, including (but not limited to) 3-methyl-2-oxazolidinone, may also be preferred for their ability to impart to the ink enhanced latency properties.

The oxazolidinone compound can be the sole solvent or humectant in the ink in addition to water. Alternatively, the oxazolidinone can be admixed with other solvents or humectants to form, along with water, the liquid vehicle of the ink. Examples of other suitable solvents and humectants include ethylene glycol, propylene glycol, diethylene glycols, glycerine, dipropylene glycols, polyethylene glycols, polypropylene glycols, amides, ethers, urea, substituted ureas, ethers, carboxylic acids and their salts, esters, alcohols, organosulfides, organosulfoxides, sulfones (such as sulfolane), alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, polyelectrolytes, methyl sulfonylethanol, imidazole, and other water miscible materials, as well as mixtures thereof.

The oxazolidinone solvent or humectant is present in the ink compositions of the present invention in any effective amount. When one or more oxazolidinone compounds are the only solvent or humectant employed in the ink, typically, the oxazolidinone is present in an amount of from about 0.5 to about 80 percent by weight of the ink composition, and preferably from about 5 to about 30 percent by weight of the ink composition, although the amount can be outside these ranges. When mixtures of an oxazolidinone and another compound form the solvent or humectant system of the ink, the total amount of humectant in the ink typically is from about 1 to about 80 percent by weight of the ink, and preferably from about 2 to about 50 percent by weight of the ink, although the amount can be outside these ranges, and the total amount of oxazolidinone in the ink typically is from about 0.5 to about 75 percent by weight of the ink, and preferably from about 5 to about 30 percent by weight of the ink, although the amount can be outside these ranges.

Also contained in the ink composition of the present invention is a colorant. Any suitable colorant can be employed, including dyes, pigments, mixtures thereof, and the like.

Any suitable dye or mixture of dyes compatible with the ink liquid vehicle can be used, including acid dyes, basic dyes, direct dyes, reactive dyes, and the like, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No.1, 7, 9, 24, 26, 48, 52, 58, 60, 61, 63, 92, 107, 109, 118, 119, 131, 140, 155, 156, 172, 194, and the like), Acid Red dyes (No.1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18]annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, NY; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Examples of suitable pigments for the inks of the present invention include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone dye, identified in the Color Index as CI 60710, CI Dispersed Red 15, a diazo dye identified in the Color Index as CI 26050, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. Additional examples of pigments include Raven® 5250, Raven® 5750, Raven® 3500 and other similar carbon black products available from Columbia Company, Regal® 330, Black Pearl® L, Black Pearl® 1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890 (BASF), Permanent Violet VT2645 (Paul Uhlich), Heliogen Green L8730 (BASF), Argyle Green XP-1 11-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange 6 (Aldrich), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow F6 1 (Hoechst), Novoperm Yellow FG1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Tolidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company)), Royal Brilliant Red RD-8192 (Paul Uhlich), Oracet Pink RF (Ciba-Geigy), Paliogen Red 3871 K (BASF), Paliogen Red 3340 (BASF), Lithol Fast Scarlet L4300 (BASF), CAB-O-JET 200 hydrophilic carbon black (Cabot Corp.), CAB-O-JET 300 hydrophilic carbon black (Cabot Corp.), and the like. Additional suitable commercially available pigment dispersions include the Hostafines available from Hoechst, including Hostafine Yellow HR and Hostafine Blue B2G, as well as dispersions available from BASF, including Disperse Black 00-6607, Luconyl Yellow 1250, Basoflex Pink 4810, Luconyl Blue 7050, and the like.

Additional examples of suitable hydrophilic pigment particles include the colored silica particles prepared as disclosed in, for example, U.S. Pat. No. 4,877,451 and U.S. Pat. No. 5,378,574, the disclosures of each of which are totally incorporated herein by reference. Other pigments can also be selected. Preferably, the pigment particle size is as small as possible to enable a stable colloidal suspension of the particles in the liquid vehicle and to prevent clogging of the ink channels when the ink is used in a thermal ink jet printer. Preferred particle average diameters are generally from about 0.001 to about 5 microns, and more preferably from about 0.1 to about 1 micron, although the particle size can be outside these ranges. Within the ink compositions of the present invention, the pigment is present in any effective amount to achieve the desired degree of coloration. Typically, the pigment is present in the ink in an amount of from about 0.1 to about 8 percent by weight, and preferably from about 2 to about 7 percent by weight, although the amount can be outside these ranges.

Other additives can also be present in the inks. For example, one or more surfactants or wetting agents can be added to the ink. These additives may be of the cationic, anionic, or nonionic types. Suitable surfactants and wetting agents include sodium lauryl sulfate, Tamol® SN, Tamol® LG, those of the Triton® series available from Rohm and Haas Company, those of the Marasperse® series, those of the Igepal® series available from GAF Company, those of the Tergitol® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks to enhance the viscosity and the stability of the ink. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, polyethylene oxide, block copolymers of polyethylene oxide and polypropylene oxide, polyvinylpyridine, polyethyleneimine, polyhydroxyethyl ethyleneimine, polyquaternary salts, and the like are typical polymeric additives. Polymeric additives can be present in the ink of the present invention in amounts of from 0 to about 10 percent by weight, and preferably from about 0.01 to about 5 percent by weight, although the amount can be outside this range.

One example of an additive to the inks is a polymeric additive consisting of two polyalkylene oxide chains bound to a central bisphenol-A-type moiety. This additive is of the formula

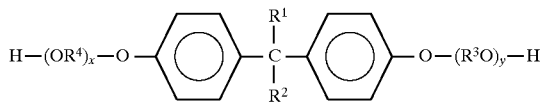

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, Conn., is a suitable polymeric additive for the inks of the present invention. In addition, compounds of the above formula can be prepared by the methods disclosed in Polyethers, N. G. Gaylord, John Wiley & Sons, New York (1963) and "Laboratory Synthesis of Polyethylene Glycol Derivatives," J. M. Harris, *J. Molecular Science—Rev. Macromol. Chem. Phys.*, C25(3), 325–373 (1985), the disclosures of each of which are totally incorporated herein by reference. The polyalkylene oxide additive is generally present in the ink in an amount of at least about 1 part per million. Typically, the polyalkylene oxide additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in U.S. Pat. No. 5,207,825, the disclosure of which is totally incorporated herein by reference.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions are generally of a viscosity suitable for use in thermal ink jet printing processes. At room temperature (i.e., about 25° C.), typically, the ink viscosity is no more than about 5 centipoise, and preferably is from about 1 to about 2.5 centipoise, although the viscosity can be outside this range.

Ink compositions suitable for ink jet printing can be prepared by any suitable process. Typically, the inks are prepared by simple mixing of the ingredients. One process entails mixing all of the ink ingredients together and filtering the mixture to obtain an ink. Inks can be prepared by preparing a conventional ink composition according to any desired process, such as by mixing the ingredients, heating if desired, and filtering, followed by adding any desired additional additives to the mixture and mixing at room temperature with moderate shaking until a homogeneous mixture is obtained, typically from about 5 to about 10 minutes. Alternatively, the optional ink additives can be mixed with the other ink ingredients during the ink preparation process, which takes place according to any desired procedure, such as by mixing all the ingredients, heating if desired, and filtering.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nobles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions containing 3-methyl-2-oxazolidinone (obtained from Aldrich Chemical Co., Milwaukee, Wis.), BASF X-34 black dye solution (containing 34 percent by weight of the dye compound; obtained from BASF Corp., Rensselaer, N.Y.), water, and other additives indicated in the table below were prepared by mixing weighed amounts of the ink components into water, stirring until all of the components had dissolved (5 minutes at most), and filtering the resulting ink composition through a 1 micron filter.

| Ink | Amt. dye (wt. %) | Amt. oxazolidinone (wt. %) | Other ingredients and amounts (wt. %) |
|---|---|---|---|
| A | 17.5 | 30 | imidazolium chloride (2%) (buffer) (Aldrich) |
| B | 30 | 30 | — |
| C | 30 | 30 | butyl carbitol (5%) (penetrant) (Aldrich) |
| D | 17 | 30 | betaine (3%) (Aldrich) |

The inks were then incorporated into a thermal ink jet printing test fixture having a printhead capable of generating images at 600 dots per inch at a frequency of 3,000 kilohertz and jetted onto Xerox® Image Series Smooth paper. Ink A exhibited a latency of greater than 75 seconds and exhibited no front face wetting after more than 106 drop ejections. Ink B exhibited a high surface tension of about 45 to 50 dynes per centimeter. The ink was sufficiently fluid for jetting and exhibited a dry time of about 20 seconds. Very high concentrations of dye were enabled by this formulation. Ink C was highly fluid and fast drying, exhibiting a dry time of less than 1 second. The images generated with this ink exhibited good edge sharpness.

Very high concentrations of dye were enabled by this formulation. Ink D exhibited a drying time of about 25 seconds, exhibited low jitter, and exhibited highly efficient drop generation. In general, the formulations demonstrated that the oxazolidinone compound enabled high concentrations of dye in the ink. The inks all also exhibited good latency characteristics. The formulations demonstrate that characteristics such as drying time and surface tension can be refined by the presence of additional additives, and that the oxazolidinone compound is compatible with these additives.

EXAMPLE II

Ink compositions containing 3-methyl-2-oxazolidinone (obtained from Aldrich Chemical Co., Milwaukee, Wis.), BASF X-34 black dye solution (containing 34 percent by weight of the dye compound; obtained from BASF Corp., Rensselaer, N.Y.), water, and other additives indicated in the table below were prepared by mixing weighed amounts of the ink components into water, stirring until all of the components had dissolved (5 minutes at most), and filtering the resulting ink composition through a 1 micron filter.

| Ink | Amt. dye (wt. %) | Amt. oxazolidinone (wt. %) | Other ingredients and amounts (wt. %) |
|---|---|---|---|
| E | 40 | 15 | butyl carbitol (5%) (Aldrich) |
| F | 40 | 15 | butyl carbitol (5%) (Aldrich) cyclohexyl pyrrolidinone (2%) (Aldrich) |
| G | 30 | 15 | pentanediol (5%) (Aldrich) imidazolium chloride (10%) (Aldrich) |
| H | 30 | 15 | hexanediol (2%) (Aldrich) cyclohexyl pyrrolidinone (1%) (Aldrich) imidazolium chloride (10%) (Aldrich) |
| I | 30 | 15 | butyl carbitol (5%) (Aldrich) imidazolium chloride (10%) (Aldrich) |

All of the inks thus prepared exhibited complete compatibility of the ink ingredients subsequent to mixing. The inks were then incorporated into a thermal ink jet printing test fixture having a printhead capable of generating images at 600 dots per inch at a frequency of 3,000 kilohertz and jetted onto Xerox® Image Series Smooth paper. All of the inks were fast drying, with dry times of from about 1 to about 4 seconds.

Other embodiments and modifications of the present invention may occur to those of ordinary skill in the art subsequent to a review of the information presented herein; these embodiments and modifications, as well as equivalents thereof, are also included within the scope of this invention.

What is claimed is:

1. An ink composition which comprises water, a colorant, and a monomeric oxazolidinone compound (a) of the formula

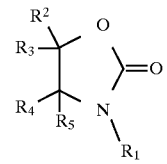

wherein $R_1$ is an alkyl group or a substituted alkyl group, and $R_2$, $R_3$, $R_4$, and $R_5$ each, independently of the others, are hydrogen atoms, alkyl groups, substituted alkyl groups, or alkoxy groups, or (b) of the formula

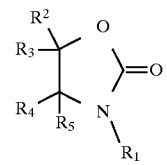

wherein $R_1$ is a hydrogen atom, and $R_2$, $R_3$, $R_4$, and $R_5$ each, independently of the others, are hydrogen atoms, alkyl groups, substituted alkyl groups, or alkoxy groups, wherein at least one of $R_2$, $R_3$, $R_4$, and $R_5$ is not a hydrogen atom.

2. An ink composition according to claim 1 wherein the oxazolidinone compound is present in the ink in an amount of from about 0.5 to about 80 percent by weight of the ink.

3. An ink composition according to claim 1 wherein the oxazolidinone compound is present in the ink in an amount of from about 5 to about 30 percent by weight of the ink.

4. An ink composition according to claim 1 wherein the oxazolidinone compound is 3-methyl-2-oxazolidinone.

5. An ink composition according to claim 1 wherein the oxazolidinone compound is 4-ethyl-2-oxazolidinone.

6. An ink composition according to claim 1 wherein the oxazolidinone compound is 5-ethyl-2-oxazolidinone.

7. An ink composition according to claim 1 wherein the oxazolidinone compound is 3-butyl-2-oxazolidinone.

8. An ink composition according to claim 1 wherein the oxazolidinone compound is 3-methyl-2-oxazolidinone, 3-ethyl-2-oxazolidinone, 3-butyl-2-oxazolidinone, 3-cyclohexyl-2-oxazolidinone, 3-(hydroxyethyl)-2-oxazolidinone, 4-methyl-2-oxazolidinone, 5-methyl-2-oxazolidinone, 3,5-dimethyl-2-oxazolidinone, 3-ethyl-5-methyl-2-oxazolidinone, 3-butyl-5-methyl-2-oxazolidinone, 3-(2-hydroxypropyl)-5-methyl-2-oxazolidinone, 4-ethyl-2-oxazolidinone, 5-ethyl-2-oxazolidinone, 4,4-dimethyl-2-oxazolidinone, 5,5,3-trimethyl-2-oxazolidinone, 5-methyl-3-ethyl-2-oxazolidinone, 3-(2-hydroxypropyl)-5-methyl-2-oxazolidinone, 5-isopropyl-3-methyl-2-oxazolidinone, 5-ethyl-4-methyl-2-oxazolidinone, 5-methyl-3-(hydroxyethyl)-2-oxazolidinone, 4,5-dimethyl-3-(hydroxyethyl)-2-oxazolidinone, 5,5-dimethyl-3-ethyl-2-oxazolidinone, 3,5-diethyl-5-methyl-2-oxazolidinone, 5-methyl-3-cyclohexyl-2-oxazolidinone, 4,5-dimethyl-3-cyclohexyl-2-oxazolidinone, 3,4,5-trimethyl-2-oxazolidinone, 3-butyl-4-ethyl-5-methyl-2-oxazolidinone, 4-ethyl-2-oxazolidinone, 4,4-diethyl-2-oxazolidinone, 5,5-diethyl-3-methyl-2-oxazolidinone, 3-(hydroxyethoxyethyl)-2-oxazolidinone, or mixtures thereof.

9. An ink composition according to claim 1 wherein at least one of $R_1$, $R_2$, $R_3$, $R_4$, and $R_5$ is a butyl group.

10. An ink composition according to claim 1 wherein $R_1$ is a hydrogen atom and $R_2$, $R_3$, $R_4$, and $R_5$ each, independently of the others, are hydrogen atoms, alkyl groups, substituted alkyl groups, or alkoxy groups, wherein at least one of $R_2$, $R_3$, $R_4$, and $R_5$ is not a hydrogen atom.

11. A printing process which comprises (a) incorporating into an ink jet printing apparatus an ink composition which comprises water, a colorant, and a monomeric oxazolidinone compound (a) of the formula

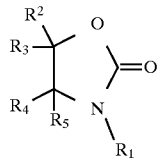

wherein $R_1$ is an alkyl group or a substituted alkyl group, and $R_2$, $R_3$, $R_4$, and $R_5$ each, independently of the others, are hydrogen atoms, alkyl groups, substituted alkyl groups, or alkoxy groups, or (b) of the formula

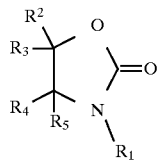

wherein $R_1$, is a hydrogen atom, and $R_2$, $R_3$, $R_4$, and $R_5$ each, independently of the others, are hydrogen atoms, alkyl groups, substituted alkyl groups, or alkoxy groups, wherein at least one of $R_2$, $R_3$, $R_4$, and $R_5$ is not a hydrogen atom.

12. A printing process according to claim 11 wherein the printing apparatus employs a thermal ink jet process wherein the ink in the nozzles is selectively heated in an imagewise pattern, thereby causing droplets of the ink to be ejected in imagewise pattern.

13. A process according to claim 11 wherein the oxazolidinone compound is present in the ink in an amount of from about 0.5 to about 80 percent by weight of the ink.

14. A process according to claim 11 wherein the oxazolidinone compound is present in the ink in an amount of from about 5 to about 30 percent by weight of the ink.

15. A process according to claim 11 wherein the oxazolidinone compound is 3-methyl-2-oxazolidinone.

16. A process according to claim 11 wherein the oxazolidinone compound is 4-ethyl-2-oxazolidinone.

17. A process according to claim 11 wherein the oxazolidinone compound is 5-ethyl-2-oxazolidinone.

18. A process according to claim 11 wherein the oxazolidinone compound is 3-butyl-2-oxazolidinone.

19. A process according to claim 11 wherein the oxazolidinone compound is 3-methyl-2-oxazolidinone, 3-ethyl-2-oxazolidinone, 3-butyl-2-oxazolidinone, 3-cyclohexyl-2-oxazolidinone, 3-(hydroxyethyl)-2-oxazolidinone, 4-methyl-2-oxazolidinone, 5-methyl-2-oxazolidinone, 3,5-dimethyl-2-oxazolidinone, 3-ethyl-5-methyl-2-oxazolidinone, 3-butyl-5-methyl-2-oxazolidinone, 3-(2-hydroxypropyl)-5-methyl-2-oxazolidinone, 4-ethyl-2-oxazolidinone, 5-ethyl-2-oxazolidinone, 4,4-dimethyl-2-oxazolidinone, 5,5,3-trimethyl-2-oxazolidinone, 5-methyl-3-ethyl-2-oxazolidinone, 3-(2-hydroxypropyl)-5-methyl-2-oxazolidinone, 5-isopropyl-3-methyl-2-oxazolidinone, 5-ethyl-4-methyl-2-oxazolidinone, 5-methyl-3-(hydroxyethyl)-2-oxazolidinone, 4,5-dimethyl-3-(hydroxyethyl)-2-oxazolidinone, 5,5-dimethyl-3-ethyl-2-oxazolidinone, 3,5-diethyl-5-methyl-2-oxazolidinone, 5-methyl-3-cyclohexyl-2-oxazolidinone, 4,5-dimethyl-3-cyclohexyl-2-oxazolidinone, 3,4,5-trimethyl-2-oxazolidinone, 3-butyl-4-ethyl-5-methyl-2-oxazolidinone, 4-ethyl-2-oxazolidinone, 4,4-diethyl-2-oxazolidinone, 5,5-diethyl-3-methyl-2-oxazolidinone, 3-(hydroxyethoxyethyl)-2-oxazolidinone, or mixtures thereof.

20. A process according to claim 11 wherein at least one of $R_1$, $R_2$, $R_3$, $R_4$, and $R_5$ is a butyl group.

21. A process according to claim 11 wherein $R_1$ is a hydrogen atom and $R_2$, $R_3$, $R_4$, and $R_5$ each, independently of the others, are hydrogen atoms, alkyl groups, substituted alkyl groups, or alkoxy groups, wherein at least one of $R_2$, $R_3$, $R_4$, and $R_5$ is not a hydrogen atom.

* * * * *